Sept. 20, 1949.   H. F. VICKERS   2,482,699
GUNFIRE CONTROL APPARATUS
Filed March 2, 1943   2 Sheets-Sheet 1
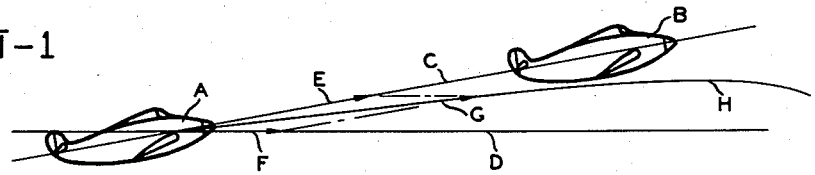
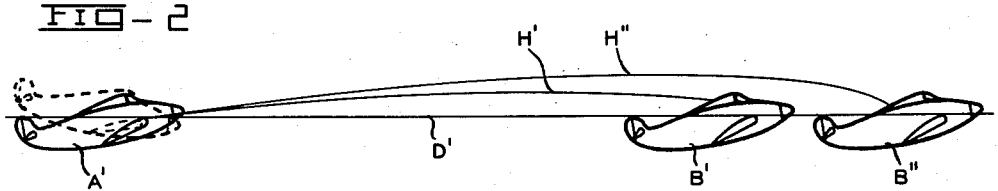
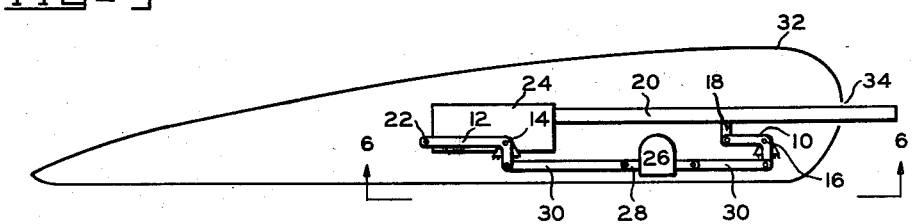
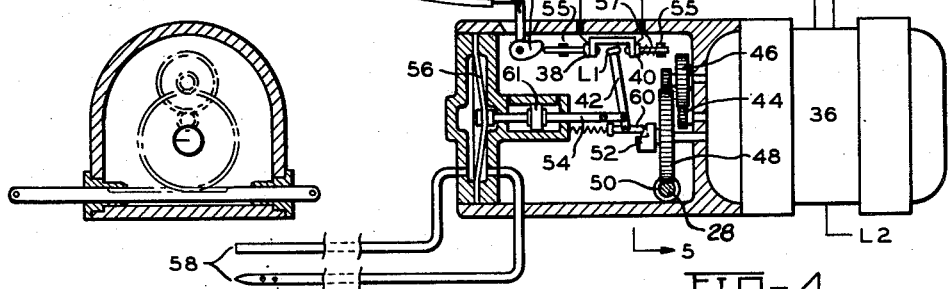
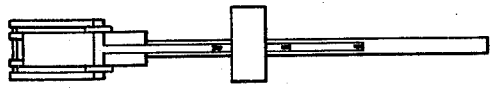
INVENTOR.
HARRY F. VICKERS
BY
ATTORNEY.

Sept. 20, 1949.  H. F. VICKERS  2,482,699
GUNFIRE CONTROL APPARATUS
Filed March 2, 1943  2 Sheets-Sheet 2
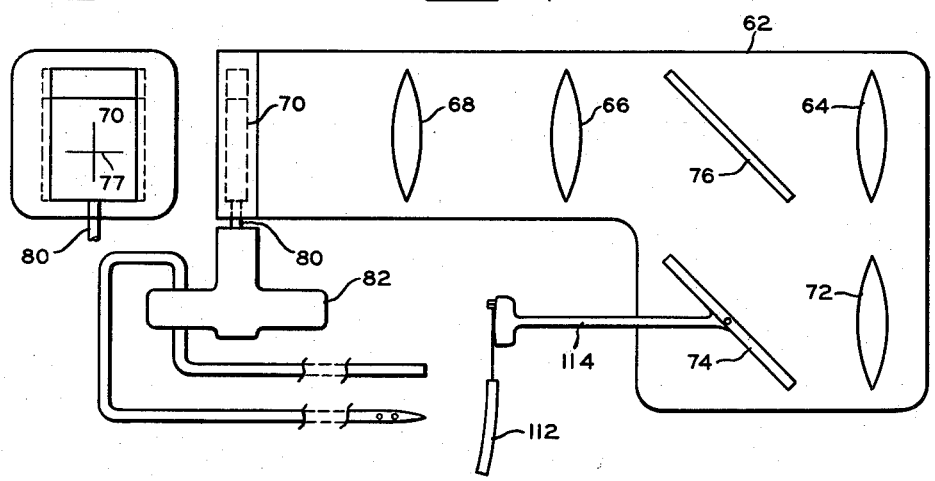
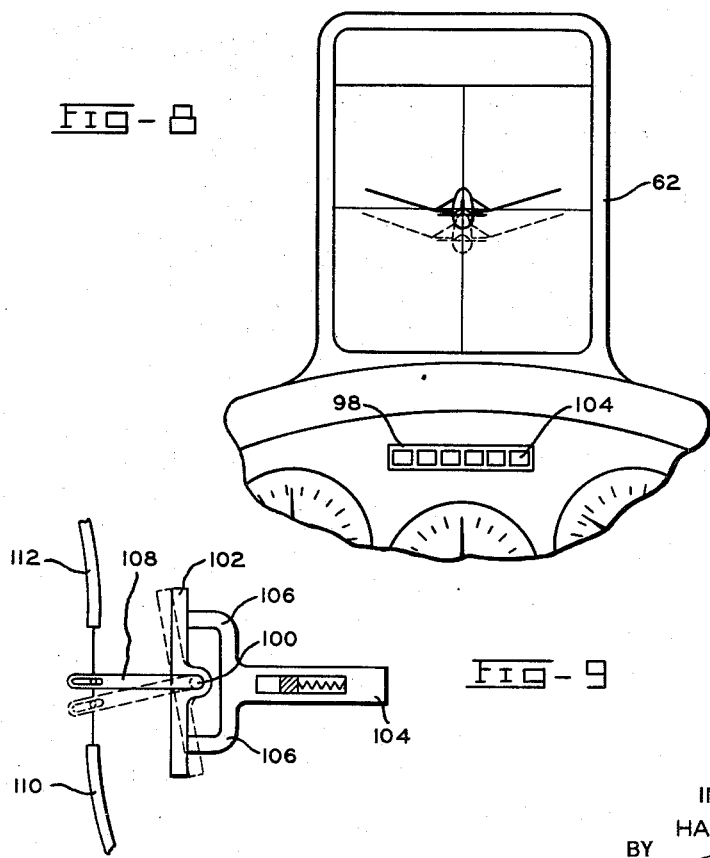
INVENTOR
HARRY F. VICKERS
BY
ATTORNEY Patented Sept. 20, 1949

2,482,699

UNITED STATES PATENT OFFICE 2,482,699

GUNFIRE CONTROL APPARATUS

Harry F. Vickers, Detroit, Mich., assignor to Vickers Incorporated, Detroit, Mich., a corporation of Michigan Application March 2, 1943, Serial No. 477,733

2 Claims. (Cl. 33—49)

1

This invention relates to aircraft of the military combat type and particularly to those carrying guns arranged to fire substantially in the direction of travel of the aircraft, as, for example, in a one-man pursuit ship.

It is known that the changes in attitude of the aircraft with respect to its true line of travel, which are induced with changes in speed or altitude or both, introduce errors in the flight of the projectile. Such errors arise from the fact that at either extreme attitude of the plane the center line of the gun bore points in a direction diverging from the line of travel of the plane. The true resultant, therefore, of the velocity of the projectile in the direction of the gun bore and its velocity in the direction of plane movement is along a line which lies intermediate these two directions.

A sighting and gun adjusting mechanism which compensates for this error offers great advantages, particularly in high-speed pursuit ships firing at reasonably short range. The problem, however, of accurately directing the fire from such a ship at moderate or longer ranges is complicated by the demands upon a pilot's mental and manual abilities which are made by any system requiring an adjustment for the momentray range of a given target. This range changes very rapidly, and the adjustment must be made at the height of battle conditions when the pilot's abilities are already taxed to the utmost.

It is accordingly an object of the present invention to provide a means for directing gunfire from a combat aircraft which is operable with a very minimum of attention from the pilot to accurately direct the gunfire at short, moderate or long range.

A further object is to provide a gunfire-directing mechanism employing in connection with attitude-compensating gun and sight adjusting means a range-adjusting means operable through the medium of a pre-selector device analogous to a push-button radio tuner by means of which a pilot may set the mechanism to a predetermined range and then fly his plane until it is at that range distance from the target at which time a burst of fire may be released.

Further objects and avantages of the present invention will be apparent from the following description, reference being had to the accompanying drawings wherein a preferred form of the present invention is clearly shown.

In the drawings:

Figure 1 is a diagrammatic view illustrating in an exaggerated form the errors in gunfire which it is an object of the present invention to overcome.

Figure 2 is a view corresponding to Figure 1 showing relative positions of an attacking and a target plane in connection with the present invention.

Figure 3 is a transverse section of a plane wing indicating diagrammatically an adjustable gun mount forming part of the present invention.

Figure 4 is a view partly in section of an attitude compensator incorporated in the gun mount of Figure 3.

Figure 5 is a cross section on line 5—5 of Figure 4.

Figure 6 is a bottom view of the gun mount shown in Figure 3.

Figure 7 is a diagrammatic view of a sight incorporating attitude and range compensation in accordance with the present invention.

Figure 8 is a diagrammatic view of a pre-selector mechanism incorporated in the sight of Figure 7.

Figure 9 is a fragmentary view of such pre-selector mechanism.

Figure 10 is an end view of the sight illustrated in Figure 7.

Referring now to Figures 1 and 2, the plane A, equipped with fixed guns, may be considered as pursuing a target represented by plane B. At high altitude and low air speed, the plane assumes a tail-down attitude, shown exaggerated in Figure 1, so that the longitudinal axis along which its fixed guns are pointed is indicated at C while its true path of movement in space is indicated at D. A projectile leaving the muzzle of a fixed gun pointing along the line C will partake of two velocity components, one represented by the vector E representing the muzzle velocity due to the propelling charge, and the other represented by vector F representing that due to the forward movement of the plane along the line D. The resultant is represented by a vector G which, it will be seen, is intermediate the lines C and D and lies in such a direction as to totally miss the target B at any range. In addition, the action of gravity becomes more significant as the projectile moves further away from the plane and causes the well-known curved trajectory illustrated by the line H.

Referring now to Figure 2, the same pursuit ship A is illustrated in solid lines in the attitude shown in Figure 1 and in dotted lines in the opposite extreme attitude. The guns of the ship, however, may be provided with attitude-compensating mechanism whereby the path of the projectile H' as the projectile leaves the gun may be modified to correct for changes in attitude of the craft relative to its path of travel D'. The target is shown in two positions along that path at B' and B" representing two different ranges. If the pilot's sighting means is provided with similar means for compensating for the attitude, his sight may also be directed along the line D' for the target position B". If it is known when the target occupies a given position, such as B' or B", and if the guns be directed along the paths H' and H", firebursts may be effectively placed on the target.

Referring now to Figure 3, an adjustable gun mount is there illustrated comprising a pair of bell cranks 10 and 12 pivoted upon stationary pivots 16 and 14, respectively. The bell crank 10 has a short horizontal leg pivoted to a lug 18 at about the mid portion of a gun barrel 20. The bell crank 12 has a longer horizontal leg pivoted to a lug 22 at the rear of a gun breech 24. A compensator 26 is stationarily mounted below the gun and has a plunger 28 projecting from its forward and rear ends and connected by links 30 to the downwardly extending legs of the bell cranks 10 and 12.

The mechanism thus far described is mounted within the confines of the air foil 32 from which the gun barrel 20 projects through a hole 34 in the leading edge.

It will be seen that movement of the plunger 28 to the left in Figure 3 will elevate the left end of the bell cranks 10 and 12 in amounts proportional to the lengths of their respective horizontal legs. These may be so proportioned as to cause the gun barrel 20 to pivot about a center in the hole 34 without requiring a pivot at this inaccessible portion of the air foil structure. Thus, by moving the plunger 28 to the right or left, the gun muzzle may be elevated or depressed to any desired position within the range of movement which may be accommodated within the air foil.

The compensator 26 may be of any suitable type responsive to the factors influencing the attitude of the plane so long as it operates to maintain the line of fire of the gun 20 coincident with or corrected relative to the line of travel of the aircraft. A suitable form is indicated diagrammatically in Figures 4 and 5 wherein an electric motor 36 is controlled by forward and reverse contacts 38 and 40 which are adapted to be selectively engaged by a movable contact arm 42. The motor 36 drives by means of reduction gearing 44—46 a large idler gear 48 which meshes with a rack 50 formed on the plunger 28. The gear 48 carries a spiral cam 52 which has a follower 60 carried by the lower end of lever 42 and which is spring biased into contact with the cam 52. An intermediate portion of the lever 42 is connected to a stem 54 operated from a diaphragm 56. The latter is connected up with the usual pressure head 58 as is commonly used as part of an air speed indicator so that the static and velocity pressures are directed to respectively opposite sides of the diaphragm. A dashpot 61 may be provided for damping the action and preventing fluttering thereof.

It will be seen that the floating contact lever 42 acts as a follow-up device to control motor 36 in such a manner as to cause the gear 48 and plunger 28 to follow the movement of the stem 54 as influenced by the diaphragm 56. Thus, in the position illustrated, the high velocity pressure at high speed and low altitude is transmitted to the lefthand side of diaphragm 56, the opposite side of which is subject to the static air pressure. Accordingly, the plunger 28 is driven by the motor 36 and is in control of the follow-up mechanism to take up positions corresponding to whatever position is taken by the stem 54. By giving the cam 52 proper shape, these positions of the plunger 28 may be so correlated with the characteristics of the aircraft as to keep the line of fire of the gun 20 pointing along the direction of flight of the aircraft.

For the purpose of introducing corrective factors whereby the gun may be elevated above the line of travel of the plane to increase the range thereof, the contacts 38 and 40 are slidably mounted in bearings 55 and are urged to the left by a spring 57. A cam 59, controlled by a lever 63, may be adjusted to shift the contacts 38 and 40 slightly to the right or left to thereby cause the follow-up mechanism to bring plunger 28 to different positions for any given position of diaphragm 56.

Referring now to Figures 7 and 8, there is illustrated diagrammatically a sight mechanism 62 of the optical type in which an image of the target is projected upon a screen. Any suitable optical system, typified by the lenses 64, 66 and 68, may be provided for producing upon a movable translucent screen 70 an image of the field of view lying along the path of flight. The sight also includes range-finding mechanism which may include an additional lens 72 and inclined mirrors 74 and 76 by means of which a second image of the field of view may also be produced upon the screen 70.

The mirror 76 may be of the "half-silvered" type whereby it is both transmittive to light passing through lens 64 and reflective to light passing through lens 72 and reflected from mirror 74. The latter is pivotally mounted to move through a small angle after the usual manner in range finders. Accordingly, for a given angular setting of mirror 74, a target at a predetermined range ahead of the sight will have one image projected upon the screen 70 directly through lenses 64, 66 and 68 and will have a second image coinciding therewith transmitted through lens 72, mirrors 74 and 76 and lenses 66 and 68 onto the screen 70. An object at any other distance will appear upon the screen as two separate non-coincident images.

The screen 70 carries a reticule represented by cross-hairs 77 so that, by shifting the screen vertically, the position of the reticule may be varied with respect to the field of view. The screen is arranged to be shifted in a manner to compensate for changes in attitude of the plane. For this purpose the screen is connected by a stem 80 to a diaphragm mechanism 82 which may be identical to the diaphragm mechanism which operates stem 54 in Figure 4.

Adjustment of the mirror 74 and lever 63 for range of a given target is provided by means of a pre-selector mechanism 98 of any suitable construction. Such a device may be analogous to those used in tuning radio receivers to predetermined frequencies by means of push buttons. A simplified form is represented diagrammatically in Figure 9 as comprising a shaft 100 carrying levers 102, each of which is secured to the shaft in different respective angular positions. Push buttons 104 are slidably mounted in front of the shaft 100 and are bifurcated at 106 to engage the ends of levers 102. When the corresponding push button 104 is pushed as shown in Figure 9, the shaft 100 is brought to a predetermined angular position by engagement of one or the other of the bifurcations 106 with an end of lever 102. The shaft 100 may carry a lever 108 which in turn is connected by suitable flexible cables 110 and 112 with lever 63 and with a lever 114 connected to mirror 74.

In considering the operation of an aircraft equipped with the mechanism above described, it will be seen that the gun compensating mechanism maintains the line of fire H' in Figure 2 at a known elevation relative to the line of travel D' such that the trajectory will intersect line D' at a known range. Thus, no matter whether the aircraft is proceeding at high or low speed or is in rare or dense air, it is assured that projectiles leave the gun in a known direction which would coincide with the line of travel D' except for the elevation angle necessitated by the trajectory at extended range.

Similarly, the sight is compensated by the action of mechanism 82 to maintain the reticle 77 (if the range finder is set for point blank range) at a position in the field of view occupied by a target lying along the line of flight D'. It will be noted that the sight as a whole is stationarily secured to the aircraft structure in the form chosen for illustration and accordingly partakes of the changes in attitude which the aircraft goes through. For example, if the plane is in a tail-down attitude as illustrated in solid lines in Figure 2, then the optical axis of the sight diverges upwardly from the line of flight D', and, accordingly, an object on that line of flight would occupy the lower portion of screen 70. Accordingly, the screen will be moved down by the factors which cause a tail-down attitude, namely, low speed and high altitude.

In order to hit a target momentarily occupying the position B', it is necessary that the line of fire be raised to the line H' in Figure 2 and also that the instant at which the target plane occupies such position be known. The lateral and vertical components of the target plane position are easily determined by visual observation of the screen 70 and the image thereon projected directly through the lens 64. When this image coincides with the reticle 76, the target lies somewhere along the line D'. The distance to the target is determined by the setting of the range finder mirror 74 and observation of the image projected through lens 72 and the mirrors 74 and 76.

The approximate range of a prospective target may be either estimated mentally or determined by trial and error by operation of various push buttons 104. Thus, a pilot may estimate that a prospective target is 600 yards ahead of him and will push the button marked "600 yards," thus setting the mirror 74 for such a range. At the same time the lever 63 is operated through the flexible connection 110 to alter the position of contacts 38 to correspond to the elevation of the line of fire necessary for such a range.

In addition, the operation of push button 104 caused the range-finding mirrors 74—76 to project an image of the proposed target upon the screen 70. The position of this image in relation to the direct image depends upon the momentary actual distance to the proposed target as compared with the range for which the mirror 74 is set. Thus, at the supposed 600-yard setting, if the target were actually more than 600 yards away from the pursuing aircraft, the secondary image reflected from mirror 76 would lie beneath the main image. By observing these two images and their positions relative to each other and to the cross-hairs 77, it becomes a simple matter to fly the aircraft into a position where the trajectory H' will pass through the proposed target. Thus, for example, if the secondary image were observed to be moving upwardly toward the main image, that would mean that the pursuit ship was closing in on the target, and he would merely have to keep the main image lined up on the cross hairs and wait until the instant when the two images coincided, at which time a burst of fire would be released. On the other hand, if the secondary image were observed to be moving away from the main image, it would be necessary to set other push buttons 104 to obtain a range setting where the secondary image is observed to be moving toward the main image.

It will thus be seen that the present invention provides a means for accurately controlling gunfire from aircraft and which requires but a minimum of conscious attention by the pilot. At the same time the range over which prospective fire power can be accurately concentrated is very markedly increased over and above that obtainable with fixed guns or even with guns compensated for ship attitude only.

While the form of embodiment of the invention as herein disclosed constitutes a preferred form, it is to be understood that other forms might be adopted, all coming within the scope of the claims which follow.

What is claimed is as follows:

1. In a combat aircraft carrying a gun mounted to fire in the direction of plane travel and aimed primarily by maneuvering the aircraft, the combination of a sight optically reproducing an image of the field in the line of fire of the gun, means for adjusting the line of fire of the gun relative to the longitudinal axis of the aircraft, means for adjusting the line of sight relative to the longitudinal axis of the aircraft, means responsive to air speed for controlling said last named adjusting means, range indicating means optically reproducing a second image of said field in the plane of the first image and coincident therewith at a predetermined range, means for adjusting the range indicating means, and means including a plurality of push buttons each operable to actuate said first named and last named adjusting means simultaneously to a different predetermined setting.

2. In a combat aircraft carrying a gun mounted to fire in the direction of plane travel and aimed primarily by maneuvering the aircraft, the combination of a sight optically reproducing an image of the field in the line of fire of the gun, means for adjusting the line of fire of the gun relative to the longitudinal axis of the aircraft, means for adjusting the line of sight relative to the longitudinal axis of the aircraft, means responsive to air speed for controlling said last named adjusting means, range indicating means optically reproducing a second image of said field in the plane of the first image and coincident therewith at a predetermined range, and manual means for simultaneously adjusting the range indicating means and for operating said means to adjust the line of fire.

HARRY F. VICKERS.

REFERENCES CITED

The following references are of record in the file of this patent:

UNITED STATES PATENTS

| Number | Name | Date |
|---|---|---|
| 713,258 | Weston | Nov. 11, 1902 |
| 1,067,859 | Bacon et al. | July 22, 1913 |
| 1,703,386 | Boykow | Feb. 26, 1929 |
| 1,719,552 | Karnes | July 2, 1929 |
| 1,724,093 | Kauch et al. | Aug. 13, 1929 |
| 1,974,864 | Fletcher | Sept. 25, 1934 |
| 2,012,960 | Couplan | Sept. 3, 1935 |
| 2,155,389 | Arden | Apr. 25, 1939 |
| 2,266,273 | Schif | Dec. 16, 1941 |
| 2,385,348 | Chafee | Sept. 25, 1945 |
| 2,403,117 | Peters | July 2, 1946 |
| 2,426,744 | Pontius et al. | Sept. 2, 1947 |
| 2,429,467 | Ketay | Oct. 21, 1947 |
| 2,438,905 | Donicht et al. | Apr. 6, 1948 |